(12) United States Patent
Clark et al.

(10) Patent No.: US 12,504,531 B1
(45) Date of Patent: *Dec. 23, 2025

(54) SYSTEM AND METHOD FOR DYNAMIC TWO-WAY RANGING USING UNMANNED AERIAL VEHICLES

(71) Applicant: BlueHalo, LLC, Huntsville, AL (US)

(72) Inventors: Alexis Henry Clark, Owens Crossroads, AL (US); Levi Judah Smolin, Brownsboro, AL (US); Ilya Semenov, Gaithersburg, MD (US)

(73) Assignee: BlueHalo, LLC, Huntsville, AL (US)

( * ) Notice: Subject to any disclaimer, the term of this patent is extended or adjusted under 35 U.S.C. 154(b) by 333 days.

This patent is subject to a terminal disclaimer.

(21) Appl. No.: 18/208,726

(22) Filed: Jun. 12, 2023

Related U.S. Application Data

(63) Continuation of application No. 17/881,271, filed on Aug. 4, 2022, now Pat. No. 11,733,372.
(60) Provisional application No. 63/324,434, filed on Mar. 28, 2022.

(51) Int. Cl.
| | | |
|---|---|---|
| *G01S 13/87* | (2006.01) | |
| *G01S 13/76* | (2006.01) | |
| *G01S 13/86* | (2006.01) | |
| *G01S 13/933* | (2020.01) | |

(52) U.S. Cl.
CPC .......... *G01S 13/878* (2013.01); *G01S 13/765* (2013.01); *G01S 13/86* (2013.01); *G01S 13/933* (2020.01)

(58) Field of Classification Search
CPC .... G01S 13/878; G01S 13/933; G01S 13/765; G01S 13/86
USPC ........................................................ 342/125
See application file for complete search history.

(56) References Cited

U.S. PATENT DOCUMENTS

| | | | | |
|---|---|---|---|---|
| 3,665,467 | A * | 5/1972 | Haroules | G01W 1/00 455/303 |
| 5,349,294 | A * | 9/1994 | Kasuboski | G01R 33/446 324/309 |
| 7,750,841 | B2 * | 7/2010 | Oswald | G01S 13/0209 342/146 |
| 9,823,655 | B2 * | 11/2017 | Cesarano | G05D 1/0202 |
| 9,891,306 | B2 * | 2/2018 | Wellman | G01S 5/0278 |
| 9,945,929 | B2 * | 4/2018 | Hehn | G01S 1/20 |
| 9,958,875 | B2 * | 5/2018 | Paduano | G06Q 10/08 |
| 9,977,117 | B2 * | 5/2018 | Parker | F41H 11/02 |
| 10,025,315 | B2 * | 7/2018 | Klinger | G05B 13/024 |

(Continued)

FOREIGN PATENT DOCUMENTS

| | | | | |
|---|---|---|---|---|
| CN | 112219137 A | * | 1/2021 | ............ G01S 19/46 |
| EP | 2879012 A1 | | 6/2015 | |

(Continued)

OTHER PUBLICATIONS

U.S. Appl. No. 17/881,271, filed Aug. 4, 2022.
U.S. Appl. No. 17/881,277, filed Aug. 4, 2022.

*Primary Examiner* — Nuzhat Pervin
(74) *Attorney, Agent, or Firm* — Amster, Rothstein & Ebenstein LLP

(57) ABSTRACT

A system and method for dynamic two-way ranging using unmanned aerial vehicles may use ultrawideband transceivers for dynamic two-way ranging between unmanned aerial vehicles among a first set of unmanned aerial vehicles. Embodiments of the system and method may allow for dynamic two-way ranging where GPS information may be limited or not be available at all.

25 Claims, 8 Drawing Sheets

(56) References Cited

U.S. PATENT DOCUMENTS

| | | | |
|---|---|---|---|
| 10,156,631 B2* | 12/2018 | Parker | H04K 3/65 |
| 10,403,161 B1* | 9/2019 | Bry | G01S 13/91 |
| 10,539,679 B2* | 1/2020 | Yun | G01S 5/04 |
| 10,571,561 B2* | 2/2020 | Zorea | G01S 3/46 |
| 10,600,295 B2* | 3/2020 | Kempel | G05D 1/0027 |
| 10,641,891 B2* | 5/2020 | Humfeld | H01Q 19/12 |
| 10,771,923 B2* | 9/2020 | Aljadeff | G01S 13/765 |
| 11,420,756 B1* | 8/2022 | Moy | B64D 31/16 |
| 11,493,628 B1* | 11/2022 | Parodi | G01S 15/42 |
| 12,095,509 B2* | 9/2024 | Rahman | H04B 17/318 |
| 12,154,009 B2* | 11/2024 | Takami | G05D 1/00 |
| 2010/0085236 A1* | 4/2010 | Franceschini | G01S 13/782 342/30 |
| 2011/0184590 A1* | 7/2011 | Duggan | G08G 5/80 701/2 |
| 2012/0092208 A1* | 4/2012 | LeMire | G01S 13/87 342/29 |
| 2014/0008496 A1* | 1/2014 | Ye | G05D 1/0038 244/190 |
| 2014/0172194 A1* | 6/2014 | Levien | G08G 5/76 701/2 |
| 2016/0293018 A1* | 10/2016 | Kim | G08G 5/53 |
| 2016/0353358 A1* | 12/2016 | DeBusk | G08G 5/55 |
| 2017/0045613 A1* | 2/2017 | Wang | G01S 13/343 |
| 2017/0227957 A1* | 8/2017 | Cesarano | G05D 1/0022 |
| 2017/0227962 A1* | 8/2017 | Cesarano | G08G 5/80 |
| 2017/0227968 A1* | 8/2017 | Klinger | G05D 1/0202 |
| 2018/0139152 A1* | 5/2018 | Shaw | H04W 84/18 |
| 2018/0341014 A1* | 11/2018 | Pesik | G01S 13/882 |
| 2019/0023392 A1* | 1/2019 | Micros | B64U 80/82 |
| 2019/0051192 A1* | 2/2019 | Schick | G08G 5/80 |
| 2019/0187241 A1* | 6/2019 | Jaeger | G01S 5/0063 |
| 2019/0260768 A1* | 8/2019 | Mestha | H04L 63/1416 |
| 2019/0297462 A1* | 9/2019 | Aljadeff | G01S 13/88 |
| 2019/0317530 A1* | 10/2019 | Yang | G08G 5/74 |
| 2019/0355145 A1* | 11/2019 | Bruner | H04W 4/38 |
| 2020/0005656 A1* | 1/2020 | Saunamaeki | G05D 1/104 |
| 2020/0041623 A1* | 2/2020 | Keyetieu | G01S 17/86 |
| 2020/0158822 A1* | 5/2020 | Owens | H01Q 1/526 |
| 2020/0209375 A1* | 7/2020 | Foggia | G08G 5/26 |
| 2020/0293040 A1* | 9/2020 | Chakraborty | G05D 1/0044 |
| 2021/0067899 A1* | 3/2021 | Sundaresan | H04W 4/029 |
| 2022/0146692 A1* | 5/2022 | Farrell | G01S 19/46 |

FOREIGN PATENT DOCUMENTS

| | | | |
|---|---|---|---|
| EP | 3671390 A1 * | 6/2020 | G08G 5/32 |
| WO | 2010138696 A1 | 12/2010 | |
| WO | 2018218370 A1 | 12/2018 | |
| WO | WO-2020086186 A2 * | 4/2020 | H04W 4/40 |
| WO | WO-2021031126 A1 * | 2/2021 | G01S 19/45 |

* cited by examiner

S602: obtaining, at the first unmanned aerial vehicle, a first set of estimated position information associated with the first unmanned aerial vehicle of the first set of unmanned aerial vehicles

S604: generating, by a processor of a first ultra-wideband transceiver, a first set of estimated range determinations with respect to each respective unmanned aerial vehicle

S606: obtaining, by a filtering module of the first unmanned aerial vehicle, the first set of estimated range determinations along with the first set of estimated position information, first location information, first acceleration information, first angular information, first magnetic field information

S608: determining, using a weighting submodule of the filtering module, a respective weight for each of the first set of estimated range determinations, the first location information, the first acceleration information, the first angular rate information, and the first angular rate information

S610: generating, by the filtering module, a first set of filtered estimated ranges associated each respective unmanned aerial vehicle

S612: processing, by a trilateration module, the first set of filtered estimated ranges to generate a second set of estimated position information

S614: transmitting, by the processor of the first ultra-wideband transceiver, the second set of estimated position information to the first navigation system

FIG. 6

S604: generating, by a processor of a first ultra-wideband transceiver, a first set of estimated range determinations with respect to each respective unmanned aerial vehicle S604A: transmitting, from the first ultra-wideband transceiver, a first poll message to the respective second ultra-wideband transceiver S604B: receiving, by the first ultra-wideband transceiver, a first delayed response message from the respective second ultra-wideband transceiver by the first ultra-wideband transceiver at a second time S604C: transmitting, by the first ultra-wideband transceiver, a first delayed final message to the respective second ultra-wideband transceiver at a third time in response to the first delayed response message S604D: determining, by the processor of the first ultra-wideband transceiver, the respective range determination between the first ultra-wideband transceiver and the respective second ultra-wideband transceiver based on the first time, the second time, the third time, the fourth time, the fifth time, and the sixth time

FIG. 6A

S612: processing, by a trilateration module, the first set of filtered estimated ranges to generate a second set of estimated position information S612A: obtaining, by the trilateration module, the first set of filtered estimated ranges associated with each respective unmanned aerial vehicle in the first set of unmanned aerial vehicles S612B: determining, by the trilateration module, a first set of magnitude error estimates based on the first set of filtered estimated ranges and the first set of estimated position information S612C: determining, by the trilateration module, a first three-dimensional direction which minimizes error by calculating a gradient of three-dimensional space with respect to the first set of magnitude error estimates S612D: generating, by the trilateration module, a second set of estimated position information as a first output based on the first three-dimensional direction which minimizes error and the first set of estimated position information

FIG. 6B

SYSTEM AND METHOD FOR DYNAMIC TWO-WAY RANGING USING UNMANNED AERIAL VEHICLES

CROSS-REFERENCE TO RELATED APPLICATIONS

The present application is a continuation of U.S. patent application Ser. No. 17/881,271, filed on Aug. 4, 2022, and entitled "SYSTEM AND METHOD FOR DYNAMIC TWO-WAY RANGING USING UNMANNED AERIAL VEHICLES", which claims benefit of and priority to U.S. Provisional Patent Application Ser. No. 63/324,434 filed Mar. 28, 2022 entitled "SYSTEM AND METHOD FOR DYNAMIC TWO-WAY RANGING USING UNMANNED AERIAL VEHICLES", the entire content of which is hereby incorporated by reference herein.

FIELD OF THE INVENTION

The present invention generally relates to a system and method for dynamic two-way ranging using unmanned aerial vehicles.

BACKGROUND

In certain environments, unmanned aerial vehicles are used to perform surveillance and other related tasks. Conventional unmanned aerial vehicles commonly use GPS for positioning and navigation. One technical problem associated with such conventional unmanned aerial vehicles is that GPS does not provide precise enough location data to position individual unmanned aerial vehicles included in a swarm or set of unmanned aerial vehicles which typically fly within a few meters of each other. In such a formation, precise ranges between drones must be determined on a real time or near real time basis to allow the swarm to maintain formation and to carry out planned objectives. Another technical limitation associated with conventional unmanned aerial vehicles is that they may be unable to determine their position and/or properly navigate in environments where GPS information may not be available at all.

Accordingly, it would be desirable to provide an unmanned aerial vehicle that avoids these and other problems.

SUMMARY

In view of the above, it is the object of the present disclosure to provide a system and apparatus to overcome the technological challenges faced in conventional unmanned aerial vehicles.

In particular, it is an object of the present disclosure to provide a method and system to determine the position of an unmanned aerial vehicle relative to other unmanned aerial vehicles in a set of unmanned aerial vehicles where GPS information may be imprecise or unavailable.

A method for determining a position of a first unmanned aerial vehicle with respect to a first set of unmanned aerial vehicles including at least a second unmanned aerial vehicle, a third unmanned aerial vehicle, and a fourth unmanned aerial vehicle in accordance with an embodiment of the present disclosure includes: a) obtaining, at the first unmanned aerial vehicle, a first set of estimated position information associated with the first unmanned aerial vehicle of the first set of unmanned aerial vehicles, wherein the first set of estimated position information comprises respective three-dimensional distance information associated with each unmanned aerial vehicle of the first set of unmanned aerial vehicles relative to the first unmanned aerial vehicle; b) generating, by a processor associated with a first ultra-wideband transceiver mounted on the first unmanned aerial vehicle, a first set of estimated range determinations with respect to each respective unmanned aerial vehicle in the first set of unmanned aerial vehicles, wherein each respective estimated range determination is associated with a respective range timestamp; c) obtaining, by a filtering module of the first unmanned aerial vehicle: 1. the first set of estimated range determinations along with the first set of estimated position information associated with first unmanned aerial vehicle from the processor of the first ultra-wideband transceiver; 2. first location information from a first navigation system of the first unmanned aerial vehicle, wherein the first location information is associated with a first respective sensor timestamp; 3. first acceleration information from a first inertial measurement unit of the first unmanned aerial vehicle, wherein the first acceleration information is associated with a second respective sensor timestamp; 4. first angular rate information from the first inertial measurement unit of the first unmanned aerial vehicle, wherein the first angular rate information is associated with a third respective sensor timestamp; and 5. first magnetic field information from a first magnetometer of the first unmanned aerial vehicle, wherein the first magnetic field information is associated with a fourth respective sensor timestamp; d) determining, using a weighting sub-module of the filtering module, a respective weight for each of the first set of estimated range determinations, the first location information, the first acceleration information, the first angular rate information, and the first angular rate information based at least on: i. one or more predetermined weighting factors; ii. the respective range timestamp associated with each estimated range determination; iii. the first respective sensor timestamp; iv. the second respective sensor timestamp; v. the third respective sensor timestamp; and vi. the fourth respective sensor timestamp; e) generating, by the filtering module, a first set of filtered estimated ranges associated each respective unmanned aerial vehicle in the first set of unmanned aerial vehicles based on the first set of estimated position information, the first set of estimated range determinations, the first location information, the first acceleration information, the first angular rate information, and the first magnetic field information, and the respective weight determined for each of the first set of estimated range determinations, the first location information, the first acceleration information, the first angular rate information, and the first angular rate information; f) processing, by a trilateration module of the first unmanned aerial vehicle, the first set of filtered estimated ranges associated with each unmanned aerial vehicle of the first set of unmanned aerial vehicles to generate a second set of estimated position information associated with the first unmanned aerial vehicle, by the steps of: 1. obtaining, by the trilateration module, the first set of filtered estimated ranges associated with each respective unmanned aerial vehicle in the first set of unmanned aerial vehicles; 2. determining, by the trilateration module, a first set of magnitude error estimates based on the first set of filtered estimated ranges and the first set of estimated position information, wherein each magnitude error estimate comprises an error between the first unmanned aerial vehicle and each unmanned aerial vehicle in the set of unmanned aerial vehicles; 3. determining, by the trilateration module, a first three-dimensional direction which minimizes error by calculating a gradient of three-dimensional space with respect to the first set of magnitude error estimates; and 4. generating, by the trilateration module, a second set of estimated position information associated with the first unmanned aerial vehicle as a first output based on the first three-dimensional direction which minimizes error and the first set of estimated position information; and g) transmitting, by the processor of the first ultra-wideband transceiver, the second set of estimated position information to the first navigation system of the first unmanned aerial vehicle.

In embodiments, the first set of estimated position information is obtained by configuring the first set of unmanned aerial vehicles on a surface to allow the first set of estimated position information to be communicated to each unmanned aerial vehicle of the first set of unmanned aerial vehicles.

In embodiments, the first set of estimated position information is provided to the first unmanned aerial vehicle prior to step a).

In embodiments, the first set of estimated position information is provided from a centralized ground system to each unmanned aerial vehicle in the set of unmanned aerial vehicles.

In embodiments, the first set of estimated position information is obtained by configuring the first set of unmanned aerial vehicles in a geometric configuration above a surface.

In embodiments, the first set of estimated position information is obtained based on respective three-dimensional location information using a respective navigation system of each unmanned aerial vehicle and providing the respective three-dimensional location information to the first unmanned aerial vehicle.

In embodiments, the first set of estimated range determinations are organized by a predetermined order of each unmanned aerial vehicle in the first set of unmanned aerial vehicles.

In embodiments, each estimated range determination of the first set of range determinations comprises a respective range determination between the first ultra-wideband transceiver and a respective second ultra-wideband transceiver associated with one of the second unmanned aerial vehicle, the third unmanned aerial vehicle, and the fourth unmanned aerial vehicle using asymmetric double sided two-way ranging, performed by the steps of: i. transmitting, from the first ultra-wideband transceiver, a first poll message to the respective second ultra-wideband transceiver at a first time; ii. receiving, by the first ultra-wideband transceiver, a first delayed response message from the respective second ultra-wideband transceiver by the first ultra-wideband transceiver at a second time, wherein the first delayed response message comprises a third time when the first poll message was received by the respective second ultra-wideband transceiver and a fourth time when the first delayed response message was transmitted by the respective second ultra-wideband transceiver; iii. transmitting, by the first ultra-wideband transceiver, a first delayed final message to the respective second ultra-wideband transceiver at a fifth time in response to the first delayed response message, wherein the first delayed final message is received by the respective second ultra-wideband transceiver at a sixth time; and iv. determining, by the processor of the first ultra-wideband transceiver, the respective range determination between the first ultra-wideband transceiver and the respective second ultra-wideband transceiver based on the first time, the second time, the third time, the fourth time, the fifth time, and the sixth time.

In embodiments, the determining step 8 iv. includes the steps of: (a) determining the time of flight associated with each message by the formula:

$$T_{prop} = \frac{T_{round1} \times T_{round2} - T_{reply1} \times T_{reply2}}{T_{round1} + T_{round2} + T_{reply1} + T_{reply2}}$$

where $T_{prop}$ is a time of flight associated with each message, $T_{round1}$ is the difference between the first time and the second time, $T_{reply1}$ is the difference between the fourth time and the third time, $T_{round2}$ is the difference between the sixth time and the fourth time, and $T_{reply2}$ is the difference between the fifth time and the second time; and (b) determining the respective range determination by the formula:

$$D = c(T_{prop})$$

where D is the respective range determination between the first ultra-wideband transceiver and the respective second ultra-wideband transceiver, c is the speed of radio waves, and $T_{prop}$ is the time of flight associated with each message.

In embodiments, the filtering module uses an Extended Kalman Filter calculation.

In embodiments, the navigation system includes a flight control computer.

In embodiments, the first inertial measurement unit comprises at least one of: 1. a first accelerometer configured to generate the first acceleration information associated with a measured acceleration; 2. a first gyroscope configured to generate the first angular information associated with a measured angular velocity; and 3. a first magnetometer configured to generate first magnetic field information associated with a measured magnetic field.

In embodiments, the first angular information is angular velocity information.

In embodiments, the respective weight is further based on at least a fifth respective sensor timestamp.

In embodiments, the first set of filtered estimated ranges comprises a filtered list of ranges associated with a respective three-dimensional distance between the first unmanned aerial vehicle and each respective unmanned aerial vehicle of the first set of unmanned aerial vehicles.

In embodiments, the first set of filtered estimated ranges is generated by the filtering module based on an Extended Kalman Filter calculation.

In embodiments, the trilateration module uses a reverse Gauss-Newton calculation.

In embodiments, the first set of filtered estimated ranges are obtained after at least 4 filtered estimated ranges are generated in the first set of filtered estimated ranges.

In embodiments, the step of determining the first set of magnitude error estimates includes: i. calculating a first set of respective initial range estimates associated with each unmanned aerial vehicle based on the first set of estimated position information; and ii. subtracting each initial range estimate of the first set of respective initial range estimates from each respective filtered range estimate of the first set of filtered estimated ranges to generate each respective magnitude error estimate.

In embodiments, step f) is repeated using the second set of estimated position information and a second set of filtered estimated ranges associated with each respective unmanned aerial vehicle to generate a third set of estimated position information.

In embodiments, step f) is repeated a predetermined number of times.

In embodiments, step f) is repeated until a difference between the third set of estimated position information and the second set of estimated position information is below a predetermined threshold.

In embodiments, step f) is repeated until a second magnitude error estimate is within a predetermined range of the first magnitude error estimate.

In embodiments, step f) is repeated until a root mean square of the second set of magnitude error estimates is below a predetermined threshold.

In embodiments, the method may further include a step of: h) transmitting, by the first ultra-wideband transceiver, the second set of estimated position information associated with the first unmanned aerial vehicle to each unmanned aerial vehicle of the first set of unmanned aerial vehicles.

In embodiments, the method may further include a step of: h) storing the second set of estimated position information in memory associated with the first unmanned aerial vehicle.

In embodiments, the method may further include a step of: h) transmitting, by the first ultra-wideband transceiver, the second set of estimated position information associated with the first unmanned aerial vehicle to a centralized ground system.

In embodiments, the method may further include a step of: h) receiving, by the first ultra-wideband transceiver, respective estimated position associated with at least a fifth unmanned aerial vehicle, a sixth unmanned aerial vehicle, and a seventh unmanned aerial vehicle.

In embodiments, the method may further include a step of: h) receiving, by the first ultra-wideband transceiver, respective estimated position associated with at least the fourth unmanned aerial, vehicle a fifth unmanned aerial vehicle, and a sixth unmanned aerial vehicle.

BRIEF DESCRIPTION OF THE DRAWINGS

The above and related objects, features and advantages of the present disclosure will be more fully understood by reference to the following detailed description of the preferred, albeit illustrative, embodiments of the present invention when taken in conjunction with the accompanying figures, wherein:

FIGS. 6, 6A and 6B are exemplary process flows for dynamic ranging between a set of an unmanned aerial vehicles in accordance with embodiments of the present invention.

DETAILED DESCRIPTION OF THE EXEMPLARY EMBODIMENTS

The present invention generally relates to a system and method for dynamic two-way ranging using unmanned aerial vehicles. In embodiments, the unmanned aerial vehicles may use ultrawideband transceivers for dynamic two way ranging.

Figure 1:
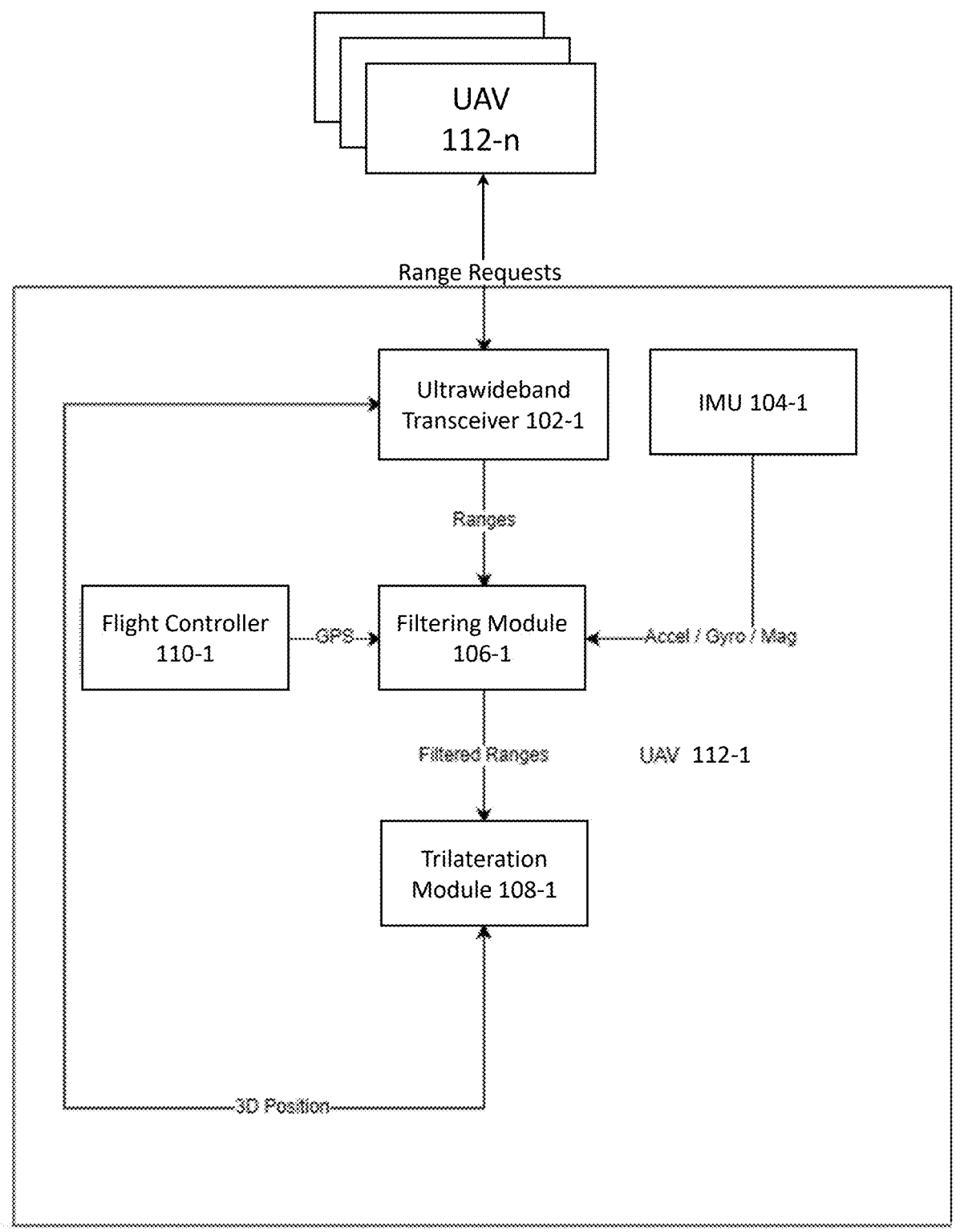
FIG. 1 is a schematic diagram of an unmanned aerial vehicle which uses dynamic two way ranging in accordance with embodiments of the present invention.

FIG. 1 is a schematic diagram of an unmanned aerial vehicle 112-1 which uses dynamic two way ranging in accordance with embodiments of the present invention. In embodiments, the first unmanned aerial vehicle (UAV) 112-1 may range between a set of n unmanned aerial vehicles in order to determine a position of the unmanned aerial vehicle 112-1 with respect to each respective unmanned aerial vehicle in the set of unmanned aerial vehicles. In embodiments, the set of unmanned aerial vehicles may include at least a second unmanned aerial vehicle 112-2, a third unmanned aerial vehicle 112-3, and a fourth unmanned aerial vehicle 112-4 (see FIG. 4, for example). In embodiments, the set of unmanned aerial vehicles may include more than four unmanned aerial vehicles. In embodiments, the first unmanned aerial vehicle 112-1 may include an ultrawideband transceiver 102-1, an inertial measurement unit (IMU) 104-1, a filtering module 106-1, a trilateration module 108-1, and a flight controller 110-1. In embodiments, each respective unmanned aerial vehicle 112-$n$ may include each of these components. In embodiments, the ultrawideband transceiver 102-1 may transmit a plurality of range requests for receipt by the ultrawideband transceivers associated with each other unmanned aerial vehicle of the set of unmanned aerial vehicles. In embodiments, the ultrawideband transceiver 102-1 may receive responses to the requests from which range information may be determined. In embodiments, the range information may be provided to a filtering module 106-1. In embodiments, the filtering module 106-1 may obtain acceleration information, angular velocity information, and magnetic field information from the IMU 104-1, for example. In embodiments, the filtering module 106-1 may obtain GPS information from the flight controller 110-1. In embodiments, the filtering module 106-1 may use the range information, acceleration information, angular velocity information, and magnetic field information, and GPS information to generate filtered range information. In embodiments, the filtered range information may be provided to the trilateration module 108-1. In embodiments, the trilateration module 108-1 may use the filtered range information to generate three-dimensional position information for the first UAV 112-1 with respect to the other unmanned aerial vehicles in the set of unmanned aerial vehicles.

Figure 2:
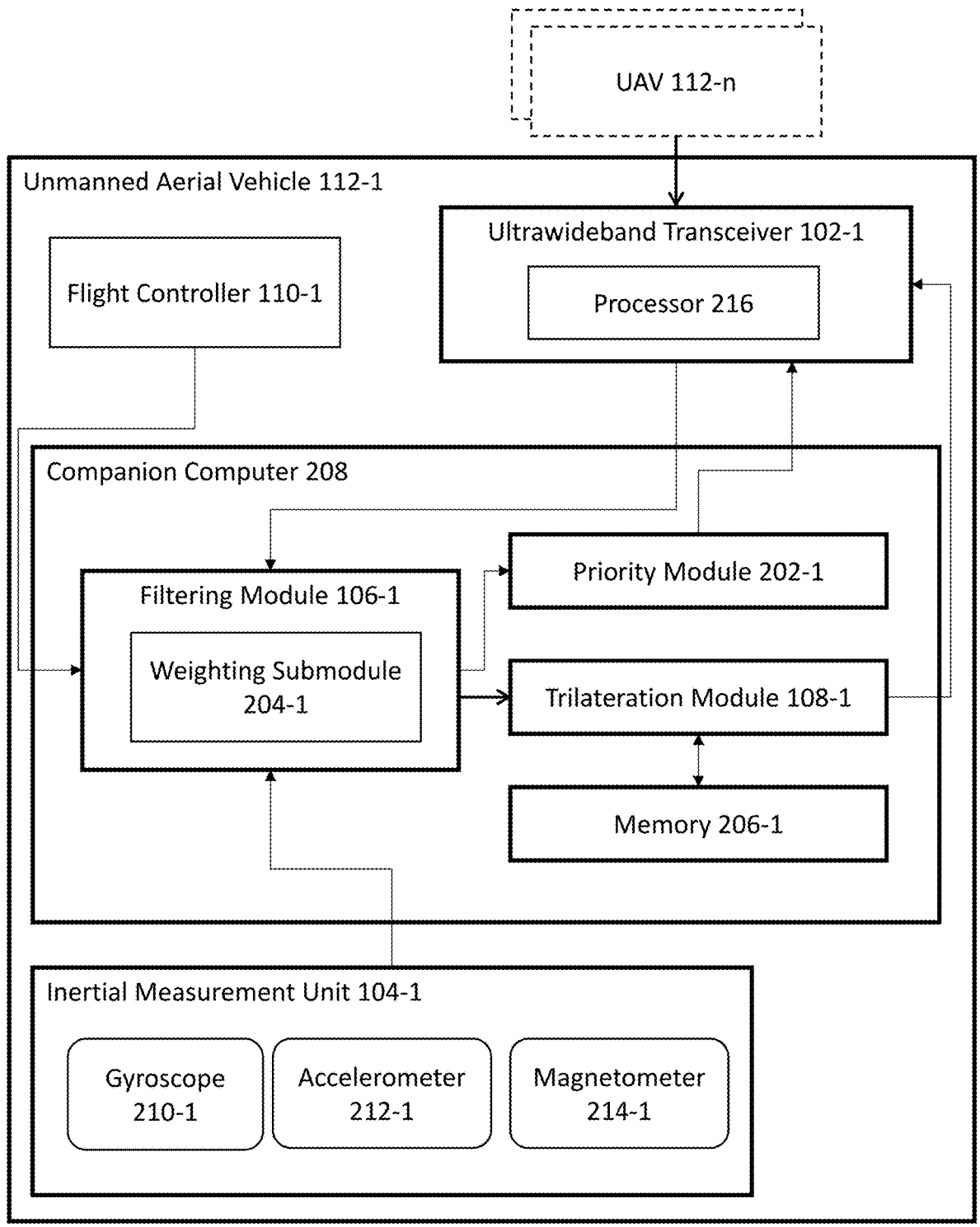
FIG. 2 is a schematic diagram of an unmanned aerial vehicle which uses dynamic two way ranging in accordance with embodiments of the present invention.

FIG. 2 is a schematic diagram of the unmanned aerial vehicle 112-1 which uses dynamic two way ranging in accordance with embodiments of the present invention. In embodiments, the UAV 112-1 may include the ultrawideband transceiver 102-1, the IMU 104-1, the flight controller 110-1, and a companion computer 208. In embodiments, the ultrawideband transceiver 102-1 may include a processor 216. In embodiments, the processor 216 may be configured to generate a set of range determinations with respect to each unmanned aerial vehicle 112-$n$ in the set of unmanned aerial vehicles. In embodiments, the processor 216 may be included in and/or operably connected to the companion computer 208. In embodiments, the companion computer 208 may include one or more software modules and memory 206-1. In embodiments, the software modules may be configured to execute instructions stored in the memory 206-1 of the companion computer 208 via a processor or other processing element. In embodiments, the processor 216 may be used to implement the modules based on instructions provided from the memory 206-1. In embodiments, the companion computer 208 may include the filtering module 106-1, the trilateration module 108-1, and a priority module 202-1. In embodiments, priority module 202-1 may be configured to determine a priority for each piece of information generated by the ultrawideband transceiver 102-1. For example, in embodiments, the priority module 202-1 may be configured to prioritize range requests from a respective unmanned aerial vehicle 112-n in the set of unmanned aerial vehicles. In embodiments, the priority module 202-1 may be configured to determine an order of priority for making range determinations based on the time of the most recent respective range determination. In embodiments, the filtering module 106-1 may include a weighting submodule 204-1. In embodiments, the weighting submodule 204-1 may be configured to weight each piece of information received by the filtering module based on one or more predetermined weighting factors, and respective timestamps associated with each piece of information received from a respective sensor. In embodiments, the trilateration module 108-1 may store the generated three-dimensional position information for the first UAV 112-1 in the memory 206-1.

In embodiments, the inertial measurement unit (IMU) 104-1 may include a gyroscope 210-1, an accelerometer 212-1, and a magnetometer 214-1. In embodiments, the gyroscope 210-1 may be configured to generate angular information associated with a measured angular velocity of the UAV 112-1. In embodiments, the angular information may be angular velocity information. In embodiments, the accelerometer 212-1 may be configured to generate acceleration information associated with a measured acceleration of the UAV 112-1. In embodiments, the magnetometer 214-1 may be configured to generate magnetic field information associated with a measured magnetic field at the UAV 112-1. In embodiments, each measurement generated by the IMU 104-1 may have an associated sensor timestamp.

Figure 3:
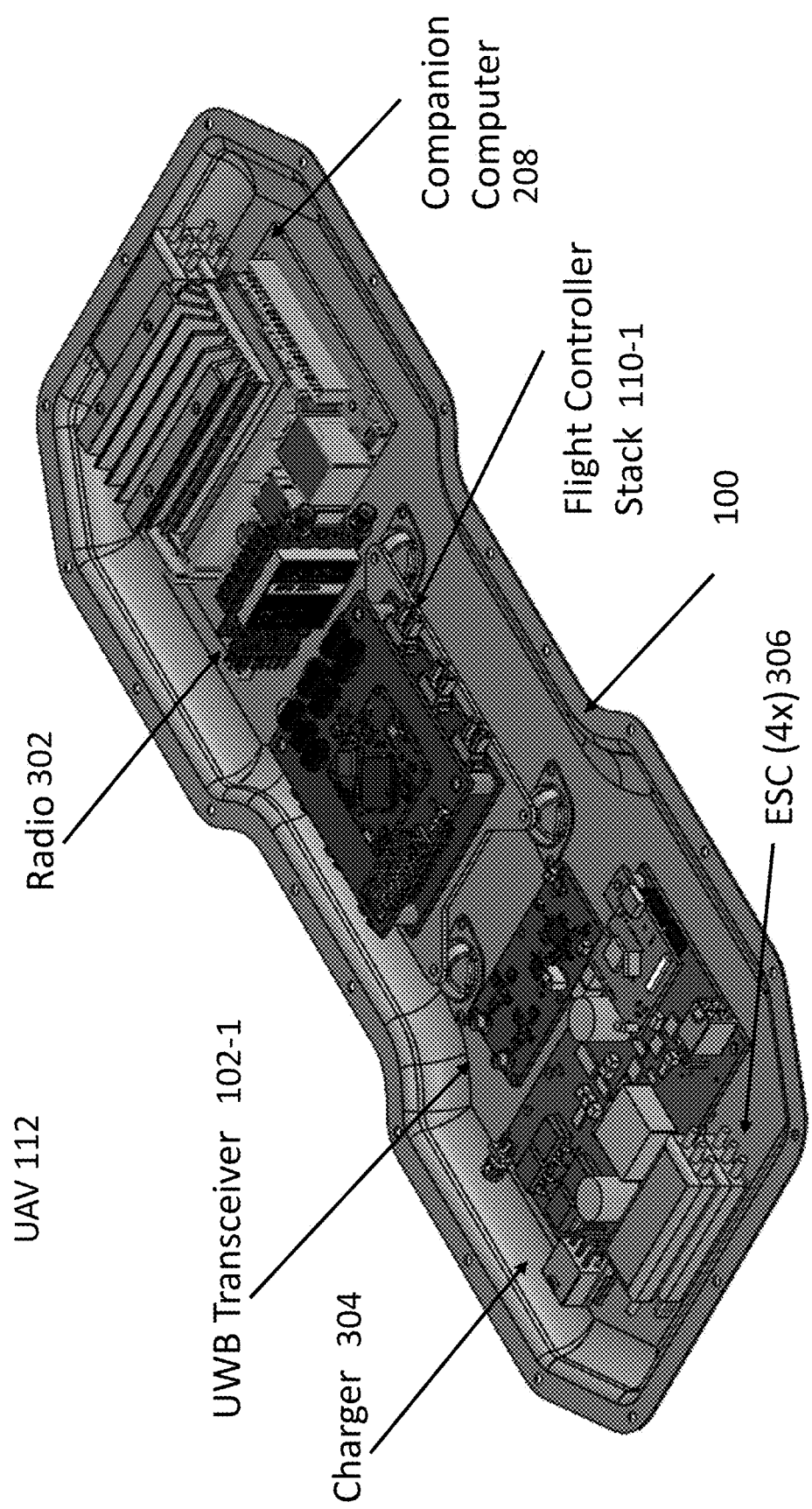
FIG. 3 is a schematic illustration of the central body of an unmanned aerial vehicle in accordance with embodiments of the present invention.

FIG. 3 is a schematic illustration of a central body 100 of an unmanned aerial vehicle 112 in accordance with embodiments of the present invention. In embodiments, the unmanned aerial vehicle 112 may include the ultrawideband transceiver 102-1, flight controller (or flight control stack) 110-1, the companion computer 208, a radio 302, a plurality of electronic speed controllers (ESC) 306, and a power source (or charger) 304. In embodiments, the radio 302 may be a 900 MHz radio. In embodiments, the radio 302 may be configured to transmit and receive radio frequency signals between the radio 302 and a remote control. In embodiments, the power source 304 may be a WIBOTIC charger (WIBOTIC is a registered trademark of WiBotic Inc.). In embodiments, the power source 304 may be a battery. In embodiments, the plurality of ESC 306 may be operatively connected to the flight controller 110-1. In embodiments, the plurality of ESC 306 may be configured to obtain a plurality of control signals provided from the flight controller 110-1. In embodiments, the plurality of electronic speed controllers ESC 306 may be configured to generate a first plurality of motor speed signals based on the plurality of control signals provided by the flight controller 108-1. In embodiments, the motor speed signals may be use to drive one or more motors of the first unmanned aerial vehicle 112-1 to position the unmanned aerial vehicle as desired.

FIGS. 6, 6A, and 6B are schematic diagrams of process flows for dynamic ranging between a set of an unmanned aerial vehicles in accordance with embodiments of the present invention. In embodiments, referring to FIG. 6, a method for determining a position of a first unmanned aerial vehicle 112-1 with respect to a set of unmanned aerial vehicles including at least a second unmanned aerial vehicle 112-2, a third unmanned aerial vehicle 112-3, and a fourth unmanned aerial vehicle 112-4 may begin with step S602. At step S602, in embodiments, the first unmanned aerial vehicle 112-1 may obtain a first set of estimated position information associated with the first unmanned aerial vehicle of the first set of unmanned aerial vehicles. In embodiments, the first set of estimated position information may include respective three-dimensional distance information associated with each unmanned aerial vehicle 112-n of the set of unmanned aerial vehicles relative to the first unmanned aerial vehicle 112-1. In embodiments, each unmanned aerial vehicle 112-n in the set may be considered a node.

In embodiments, the first set of estimated position information may be obtained in circumstances where GPS information for each unmanned aerial vehicle may not be available. This may be the case, for example, in remote areas where GPS information may not be reliably available or environments in which GPS information may be blocked or disrupted. In embodiments, the first set of estimated position information may be based on a position of the first unmanned aerial vehicle 112-1 on a surface relative to the other unmanned aerial vehicles in the set. In embodiments, the set of unmanned aerial vehicles may be position on the surface is a predetermined configuration and the first set of estimated position information may be communicated to each unmanned aerial vehicle 112-n of the set of unmanned aerial vehicles. In embodiments, the first set of estimated position information may be pre-loaded on each unmanned aerial vehicle. In embodiments, the first set of estimated position information may be provided from a centralized ground station to each unmanned aerial vehicle 112-n in the set of unmanned aerial vehicles. In embodiments, the surface may be provided at a known location such that a position of each of the unmanned aerial vehicles 112-n in the set configuration on the surface may be know in advance.

In embodiments, the first set of estimated position information may be obtained by configuring the first set of unmanned aerial vehicles in a geometric configuration above a surface. In embodiments, the first set of estimated position information may provide an initial estimate of each vehicle, or node's location. In embodiments, for example, three nodes (unmanned aerial vehicles) may use a respective altimeter of their respective flight controller 110 to move to the same altitude. In embodiments, the three nodes (unmanned aerial vehicles) may then form a geometric shape such as an equilateral triangle (where the range and angle between each node is equal). In embodiments, this may allow both the initial distance and the angle between each node or UAV to be known. In embodiments, the first unmanned aerial vehicle 112-1 may be the origin node and the first set of estimated position information may provide range information relative to the first unmanned aerial vehicle 112-1. In embodiments, another node (unmanned aerial vehicle) may be added by forming a second equilateral triangle with two of the previous nodes. In embodiments, now that four nodes with relative positions are known, an additional node may be added at the same altitude. In embodiments, these steps may be repeated at different altitudes using the altimeter to provide diversity in altitude dimension. In embodiments, additional nodes or UAVs may be added.

In embodiments, if GPS information is available, the first set of estimated position information may be obtained by generating respective three-dimensional location information using a respective GPS navigation system of each unmanned aerial vehicle and providing the respective three-dimensional location information to the first unmanned aerial vehicle 112-1.

In embodiments, the process may continue with step S604. At step S604, in embodiments, the processor 216 of a first ultrawideband transceiver 102-1 mounted on the first unmanned aerial vehicle 112-1 may generate a first set of estimated range determinations with respect to each respective unmanned aerial vehicle 112-n in the set of unmanned aerial vehicles 1. In embodiments, the processor 216 may be provided in the companion computer 208. In embodiments, the companion computer 208 may include a separate processor that may be used to generate the first set of estimated range determinations. In embodiments, each respective estimated range determination may be associated with a respective range timestamp. For example, in embodiments, the set of estimated range determinations may be a list of ranges between the first unmanned aerial vehicle and 112-1 and each unmanned aerial vehicle 112-n in the set of unmanned aerial vehicles. In embodiments, the first set of estimated range determinations may be organized by a predetermined order of each unmanned aerial vehicle 112-n in the set of unmanned aerial vehicles. That is, in embodiments, the order by which range determinations are made may be predetermined and provided to the ultrawideband transceiver 102-1 beforehand.

In embodiments, each estimated range determination may include a respective range determination between the first ultra-wideband transceiver 102-1 and a respective second ultrawideband transceiver 102-n associated with one of the second unmanned aerial vehicle 112-2, the third unmanned aerial vehicle 112-3, and the fourth unmanned aerial vehicle 112-4 using asymmetric double sided two-way ranging. In embodiments, the asymmetric doubled sided two-way ranging method may be dynamic without reference to a known anchor point.

Figure 4:
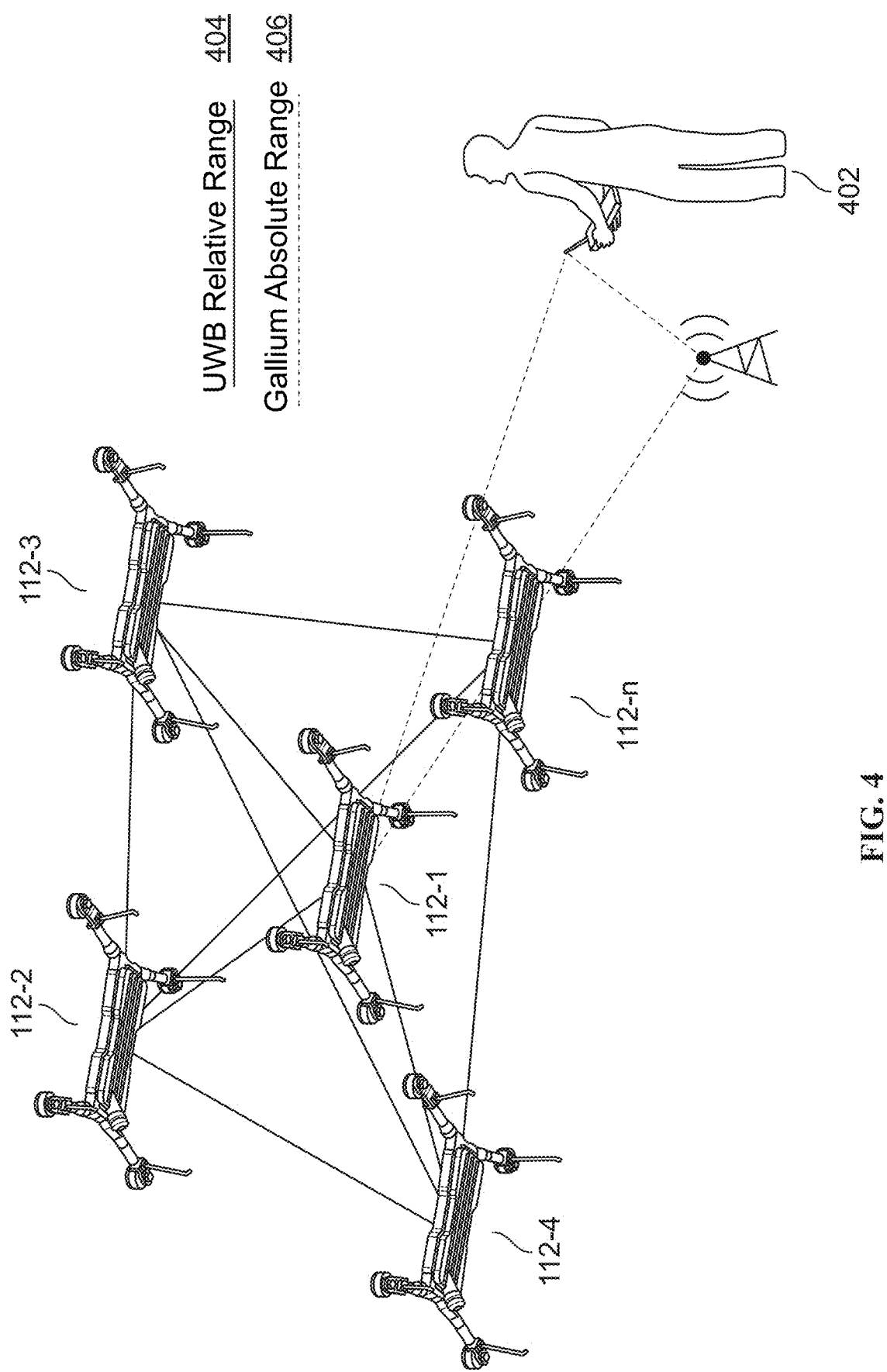
FIG. 4 is an illustration depicting a plurality of unmanned aerial vehicles using dynamic two way ranging in accordance with embodiments of the present invention.

FIG. 4 is an illustration depicting a plurality of unmanned aerial vehicles 112-1, 112-2, 112-3, 112-4, 112-n using dynamic two way ranging in accordance with embodiments of the present invention. In embodiments, the first ultra-wideband transceiver 102-1 may be an initiator and a respective second ultrawideband transceiver 102-2, associated with the second unmanned aerial vehicle 112-2 may be a responder. In embodiments, a method for asymmetric double sided two-way ranging may be used to determine the time of flight between two transceiver nodes. In embodiments, the time of flight may be used to determine the distance between the two nodes based on the known speed of the radio waves. In embodiments, asymmetric double sided two-way ranging may be used rather than simple two way ranging in order to reduce the error rate from clock drift between nodes. In embodiments, an operator 402 may use RF communication to control one or more unmanned aerial vehicles in the set of unmanned aerial vehicles. In embodiments, absolute ranging 406 may be used to for controlling the set of unmanned aerial vehicles. In embodiments, ultrawideband relative ranging 404 may be used by each ultrawideband transceiver to determine the distance between other respective nodes dynamically. In embodiments, the relative ranging 404 may be used and determined without reference to a known anchor point.

In embodiments, the generating step S604 may include one or more sub steps. Referring to FIG. 6A, in embodiments, the generating step S604 may continue with sub step S604A. At step S604A, a first poll message may be transmitted from the first ultrawideband transceiver 102-1 of the first unmanned aerial vehicle 112-1, which is the initiator, to the respective second ultrawideband transceiver 102-n, which may be associated with any one of the unmanned aerial vehicles 112-2, 112-3, 112-4, 112-n, at a first time. In embodiments, the first poll message may take an unknown amount of time to reach the second ultrawideband transceiver 102-n.

Referring to FIG. 6A, in embodiments, the process may continue with sub step S604B. At step S604B, in embodiments, the first ultrawideband transceiver 102-1 may receive a first delayed response message from the respective second ultrawideband transceiver 102-n at a second time. In embodiments, the first delayed response message may include a third time which indicates the time at which the first poll message was received by the respective second ultra-wideband transceiver 102-n and a fourth time at which the first delayed response message was transmitted by the respective second ultra-wideband transceiver 102-n. In embodiments, the first delayed response message may be transmitted by the second ultrawideband transceiver 102-n after a programmed delay time which is known and included in the first delayed response message.

Referring to FIG. 6A, in embodiments, the process may continue with sub step S604C. At step S604C, in embodiments, the first ultrawideband transceiver 102-1 may transmit a first delayed final message to the respective second ultrawideband transceiver 102-n at a fifth time in response to the first delayed response message. In embodiments, the first delayed final message may be received by the respective second ultra-wideband transceiver 102-n at a sixth time. In embodiments, the first delayed final message may be transmitted by the first ultrawideband transceiver 102-1 after a second programmed delay time which is known and included in the first delayed message transmitted to the respective second ultra-wideband transceiver 102-n.

Figure 5:
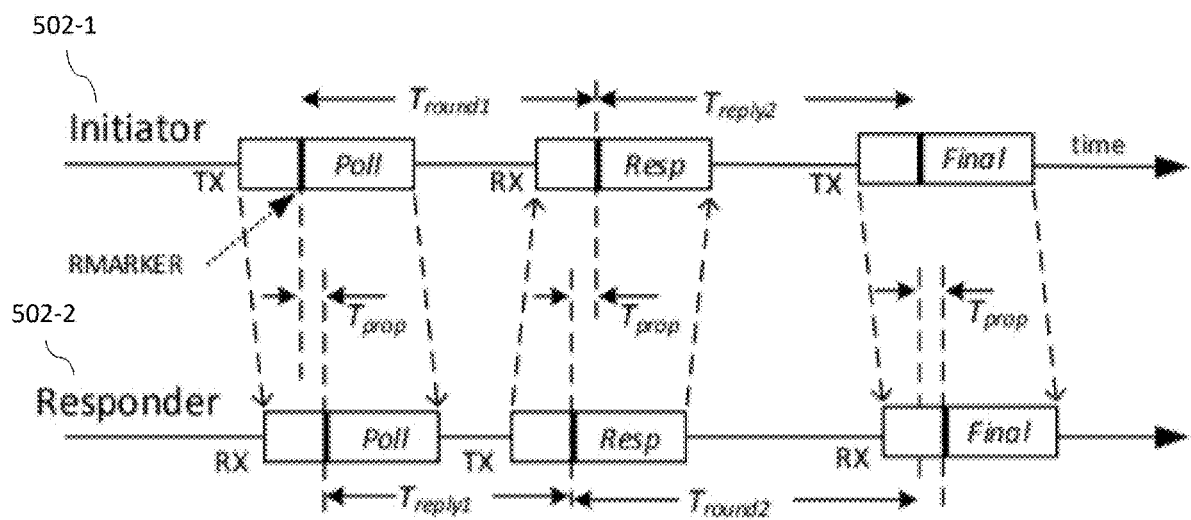
FIG. 5 is a schematic illustration of an unmanned aerial vehicle which uses dynamic two way ranging in accordance with embodiments of the present invention.

Referring to FIG. 6A, in embodiments, the process may continue with sub step S604D. At step S604D, in embodiments, the processor 216 of the first ultrawideband transceiver 102-1, may determine the respective range determination between the first ultra-wideband transceiver 102-1 and the respective second ultra-wideband transceiver 102-n based on the first time, the second time, the third time, the fourth time, the fifth time, and the sixth time. In embodiments, the determining step may be performed by first determining the time of flight associated with each message by using the formula:

$$T_{prop} = \frac{T_{round1} \times T_{round2} - T_{reply1} \times T_{reply2}}{T_{round1} + T_{round2} + T_{reply1} + T_{reply2}} \quad \text{(Eq. 1)}$$

where $T_{prop}$ is a time of flight associated with each message, $T_{round1}$ is the difference between the first time and the second time, $T_{reply1}$ is the difference between the fourth time and the third time, $T_{round2}$ is the difference between the sixth time and the fourth time, and $T_{reply2}$ is the difference between the fifth time and the second time. Referring to FIG. 5, the figure depicts each time period including $T_{prop}$, $T_{round1}$, $T_{reply1}$, $T_{round2}$, and $T_{reply2}$.

In embodiments, the respective range determination may then be calculated by the formula:

$$D = c(T_{prop}) \quad \text{(Eq. 2)}$$

where D is the respective range determination between the first ultra-wideband transceiver 102-1 and the respective second ultra-wideband transceiver 102-n, c is the speed of radio waves, and $T_{prop}$ is the time of flight associated with each message. In embodiments, the speed of radio waves c may be the same as the speed of light.

FIG. 5 is a schematic illustration of an unmanned aerial vehicle 112 which uses dynamic two way ranging in accordance with embodiments of the present invention. In embodiments, the first ultrawideband transceiver 102-1 may be an initiator 502-1 and a respective second ultrawideband transceiver 102-2, associated with the second respective unmanned aerial vehicle 112-2 may be a responder 502-2. In embodiments, poll messages, delayed response messages, and delayed final messages may be used to calculate the distance between each node based on the times at which each message was transmitted and received by each unmanned aerial vehicle 112.

In embodiments, the set of estimated range determinations may include a list of respective range determinations between the first unmanned aerial vehicle 112-1 and each unmanned aerial vehicle 112-n of the set of unmanned aerial vehicles, including the unmanned aerial vehicles 112-2, 112-3, 112-4. In embodiments, the set of estimated range determinations may include a list respective range determinations between each unmanned aerial vehicle in the set of unmanned aerial vehicles. In embodiments, an exemplary list of estimated range determinations calculated by each ultrawideband transceiver is as follows:

| Node A ID | Node B ID | Distance (Node A <-> Node B) | Timestamp of Reading (Milliseconds from Epoch) |
| --- | --- | --- | --- |
| 1 | 2 | 7.043254144 | 1609683130005 |
| 1 | 3 | 12.14009005 | 1609683130067 |
| 1 | 4 | 18.91383167 | 1609683130089 |
| 1 | 5 | 22.30243785 | 1609683130252 |
| 1 | 6 | 20.77752133 | 1609683130254 |
| 1 | 7 | 5.654327833 | 1609683130346 |
| 1 | 8 | 19.18975302 | 1609683130545 |
| 1 | 9 | 28.85278675 | 1609683130565 |
| 1 | 10 | 33.4994266 | 1609683130680 |
| 2 | 3 | 14.11440707 | 1609683130733 |
| 2 | 4 | 20.59026648 | 1609683130750 |
| 2 | 5 | 22.90290465 | 1609683130853 |
| 2 | 6 | 18.82916484 | 1609683130946 |
| 2 | 7 | 7.266519315 | 1609683130970 |
| 2 | 8 | 22.15369558 | 1609683131013 |
| 2 | 9 | 26.42265938 | 1609683131182 |
| 2 | 10 | 31.43482712 | 1609683131231 |
| 3 | 4 | 10.61071224 | 1609683131397 |
| 3 | 5 | 12.32845613 | 1609683131399 |
| 3 | 6 | 14.87352867 | 1609683131516 |
| 3 | 7 | 17.49934047 | 1609683131691 |
| 3 | 8 | 13.99581534 | 1609683131740 |
| 3 | 9 | 19.6943246 | 1609683131774 |
| 3 | 10 | 23.68416076 | 1609683131797 |
| 4 | 5 | 5.055679944 | 1609683131875 |
| 4 | 6 | 10.39041626 | 1609683131964 |
| 4 | 7 | 23.35348283 | 1609683132127 |
| 4 | 8 | 5.992663951 | 1609683132180 |
| 4 | 9 | 16.6619555 | 1609683132204 |
| 4 | 10 | 27.34761543 | 1609683132284 |
| 5 | 6 | 9.494859236 | 1609683132446 |
| 5 | 7 | 26.80078357 | 1609683132474 |
| 5 | 8 | 10.6636401 | 1609683132493 |
| 5 | 9 | 12.29685786 | 1609683132514 |
| 5 | 10 | 23.60198686 | 1609683132910 |
| 6 | 7 | 23.69481662 | 1609683132985 |
| 6 | 8 | 14.37798694 | 1609683133075 |
| 6 | 9 | 11.14817382 | 1609683133136 |
| 6 | 10 | 25.75748495 | 1609683133157 |
| 7 | 8 | 23.12596935 | 1609683133325 |
| 7 | 9 | 32.44958433 | 1609683133333 |
| 7 | 10 | 37.72041018 | 1609683133430 |
| 8 | 9 | 22.185397 | 1609683133934 |
| 8 | 10 | 33.22177084 | 1609683134115 |
| 9 | 10 | 17.84604381 | 1609683134123 |

In embodiments, the set of unmanned aerial vehicles may include more than 4 as noted above. In the exemplary range information listed above, the set of unmanned aerial vehicles includes 10 unmanned aerial vehicles.

In embodiments, referring back to FIG. 6, the process may continue with step S606. At step S606, in embodiments, a filtering module 106-1 of the first unmanned aerial vehicle 112-1 may obtain respective range and sensor information. In embodiments, the filtering module 106-1 may be a software module on the companion computer 208. In embodiments, the companion computer 208 may include a processor and memory configured to store instructions for execution by the processor to implement the functions of the filtering module 106-1. In embodiments, as noted above the processor 216 may be included in the companion computer 208. In embodiments, the filtering module 106-1 may obtain the first set of estimated range determinations along with the first set of estimated position information associated with first unmanned aerial vehicle 112-1 from the processor 216 of the first ultra-wideband transceiver 102-1. In embodiments, the filtering module 106-1 may obtain first location information from a navigation system of the first unmanned aerial vehicle 112-1. In embodiments, the navigation system may be a flight controller 110-1. In embodiments, the first location information may be associated with a first respective sensor timestamp.

In embodiments, the filtering module 106-1 may obtain first acceleration information from the inertial measurement unit 104-1 of the first unmanned aerial vehicle 112-1. In embodiments, the first acceleration information may be associated with a second respective sensor timestamp. In embodiments, the filtering module 106-1 may obtain first angular information from the inertial measurement unit 104-1 of the first unmanned aerial vehicle 112-1. In embodiments, the first angular rate information may be associated with a third respective sensor timestamp. In embodiments, the filtering module 106-1 may obtain first magnetic field information from the magnetometer 214-1 of the first unmanned aerial vehicle 112-1. In embodiments, the inertial measurement unit 104-1 may include the gyroscope 210-1, the accelerometer 212-1, and the magnetometer 214-1. In embodiments, the gyroscope 210-1 may be configured to generate angular information associated with a measured angular velocity of the UAV 112-1. In embodiments, the angular information may be angular velocity information. In embodiments, the accelerometer 212-1 may be configured to generate acceleration information associated with a measured acceleration of the UAV 112-1. In embodiments, the magnetometer 214-1 may be configured to generate magnetic field information associated with a measured magnetic field at the UAV 112-1. In embodiments, each measurement generated by the IMU 104-1 may have an associated sensor timestamp.

In embodiments, the filtering module 106-1 may use an Extended Kalman Filter calculation. Kalman filtering is an algorithm which uses a series of measurements observed over time, including statistical noise and other inaccuracies, and produces estimates of unknown variables by estimating a joint probability distribution over the variables for each time frame. In embodiments, in the Extended Kalman Filter, the state transition and observations may be in nonlinear functions, such as those produced by sensors. In embodiments, the Extended Kalman filter may be used to provide a nonlinear state estimate, for example, in sensor fusion with respect to navigation and GPS systems.

In embodiments, referring to FIG. 6, the process may continue with step S608. At step S608, in embodiments, a weighting submodule 204-1 of the filtering module 106-1 may determine a respective weight for each of the first set of estimated range determinations, the first location information, the first acceleration information, the first angular rate information, and the first magnetic field information. In embodiments, the weighting submodule 204-1 may be a software module located within the filtering module 106-1. In embodiments, the weighting submodule 204-1 may be provided on or by the companion computer 208 distinct from the filtering module 106-1. In embodiments, the determination for each respective weighting factor may be made based at least on one or more predetermined weighting factors, the respective range timestamp associated with each estimated range determination, and the respective sensor timestamps associated with each sensor measurement from the flight controller 110-1 and IMU 104-1. In embodiments, the one or more predetermined weighting factors may be applied based on the reliability and accuracy of the respective sensor. In embodiments, the weighting of each piece of information may be based on how old the respective piece of information is. For example, in embodiments, a piece of information generated by a sensor one second ago may be more reliable than a piece of information generated by a different sensor five seconds ago.

In embodiments, referring to FIG. 6, the process may continue with step S610. At step S610, in embodiments, the filtering module 106-1 may generate a set of filtered estimated ranges associated with each respective unmanned aerial vehicle 112-$n$ in the first set of unmanned aerial vehicles. In embodiments, the set of filtered estimated ranges may be generated based on the first set of estimated position information, the first set of estimated range determinations, the first location information, the first acceleration information, the first angular rate information, and the first magnetic field information, along with the respective weight determined for each piece of information in step S608. In embodiments, the first set of estimated ranges may include a filtered list of ranges associated with a respective three-dimensional distance between the first unmanned aerial vehicle 112-1 and each unmanned aerial vehicle 112-$n$ in the first set of unmanned aerial vehicles.

In embodiments, an exemplary set of filtered estimated ranges calculated by the filtering module 106-1 is as follows:

| Node ID | Node Location (X, Y, Z) |
| --- | --- |
| 1 | [10.45810138, 19.82980254, 27.92778821] |
| 2 | [7.78040436, 22.66732188, 22.06384316] |
| 3 | [18.66731032, 13.70716057, 21.40636732] |
| 4 | [15.5334285, 3.79674479, 19.26894314] |
| 5 | [17.72885614, 3.38209432, 14.73340649] |
| 6 | [ 9.75596408, 7.29267541, 11.37205388] |
| 7 | [ 5.63414425, 22.57629647, 29.00591065] |
| 8 | [12.93121651, 1.20707444, 24.00576726] |
| 9 | [17.08607621, 6.93699338, 2.97902] |
| 10 | [31.25574256, 17.71849689, 1.74814651] |

In embodiments, referring to FIG. 6, the process may continue with step S612. At step S612, in embodiments, the set of filtered estimated range determinations may be processed by the trilateration module 108-1, to generate a second set of estimated position information associated with the set of unmanned aerial vehicles. In embodiments, the trilateration module 108-1 may use a reverse Gauss-Newton calculation.

In embodiments, the processing step S612 may include one or more sub steps. Referring to FIG. 6A, in embodiments, the processing step S612 may continue with sub step S612A. At step S612A, the trilateration module 108-1 obtains the first set of filtered estimated ranges associated with each respective unmanned aerial vehicle in the first set of unmanned aerial vehicles. In embodiments, the first set of filtered estimated ranges are obtained after at least 4 filtered estimated ranges are generated in the first set of filtered estimated ranges.

In embodiments, the step S612A may be followed by step S612B in which a first set of magnitude error estimates may be determined by the trilateration module 108-1. In embodiments, the first set of magnitude error estimates may be determined based on the first set of filtered estimated ranges and the first set of estimated position information. In embodiments, each magnitude error estimate may include an error between the first unmanned aerial vehicle 112-1 and each unmanned aerial vehicle 112-$n$ in the set of unmanned aerial vehicles.

In embodiments, the step S612B may include a step of calculating a first set of respective initial range estimates associated with each unmanned aerial vehicle 112-$n$ based on the first set of estimated position information and subtracting each initial range estimate of the first set of respective initial range estimates from each respective filtered range estimate of the first set of filtered estimated ranges to generate each respective magnitude error estimate. In embodiments, for example, the first set of respective initial range estimates may be the initial guess by the unmanned aerial vehicle 112-1 as to its location with respect to each unmanned aerial vehicle in the set.

In embodiments, step S612B may be followed by step S612C in which first three-dimensional direction information may be determined by the trilateration module 108-1. In embodiments, the first three-dimensional direction information may be a three-dimensional vector or direction. In embodiments, this determination may include calculating a gradient of three-dimensional space with respect to the first set of magnitude error estimates which may minimize error.

In embodiments, step S612C may be followed by step S612D in which the second set of estimated position information associated with the first unmanned aerial vehicle is generated by the trilateration module 108-1 based on the first three-dimensional direction which minimizes error and the first set of estimated position information. In embodiments, the second set of estimated position information may be an adjustment of the first set of estimated position in the direction indicated by the calculated three-dimensional vector.

In embodiments, steps S612A-S612D may be repeated using the second set of estimated position information and a second set of filtered estimated ranges associated with each respective unmanned aerial vehicle generated by the filtering module 106-1 to generate a third set of estimated position information associated with the first unmanned aerial vehicle 112-1. In embodiments, each iteration may be carried out in a different time period. In embodiments, the steps S612A-S612D may be repeated a predetermined number of times to provide additional sets of estimated position information. In embodiments, the steps S612A-S612D may be repeated until a difference between the third set of estimated position information and the second set of estimated position information is below a predetermined threshold. For example, in embodiments, the steps may be repeated so that the position information is within a certain range of accuracy. In embodiments, the steps S612A-S612D may be repeated until a second magnitude error estimate determined by steps S612A-S612D is within a predetermined range of the first magnitude error estimate. In embodiments, the steps S612A-S612D may be repeated until a root mean square of the second set of magnitude error estimates is below a predetermined threshold.

In embodiments, the steps of S612A-612D may implemented via a trilateration function. In embodiments, the entry point of this function may be a Node function which may be called within a real-time environment where range information is coming in asynchronously. In embodiments, the Node function may be a wrapper function for Localize which may run an iteration of the algorithm. In embodiments, Localize may make use of two subfunctions Localize_Tetrahedron and Trilateration.

In embodiments, the Node function manages a matrix describing the ranges between each unmanned aerial vehicle (node), updating it with sensor information as it is received. This matrix may be the input to Localize which outputs the solved positions of each unmanned aerial vehicle with solvable number of ranges in the current matrix. In embodiments, Node may have the ability to publish the current range solution matrix to other parts of the system. The following is exemplary pseudocode for the Node function:

| | Node( ) |
|---|---|
| 1 | Input: Subscribes to relevant data topics |
| 2 | Output: Publishes localization estimate |
| 3 | Subscribe( ) to range topics from all drones |
| 4 | While True |
| 5 | \| If new range information available |
| 6 | \| \| Insert into edgeval_matrix |
| 7 | \| End If |
| 8 | \| If edgeval_matrix = filled |
| 9 | \| \| output = Localize(edgeval_matrix) |
| 10 | \| \| Publish(output) |
| 11 | \| End If |
| 12 | \| Sleep( ) |
| 13 | End While |

In embodiments, the Localization function may summarize a holistic graph solving approach which may be generally broken down into three steps:

Step 1.) First, it solves a fully connected core of four unmanned aerial vehicles (nodes) which form a tetrahedron. It does this by using the Localize_Tetrahedron function (described in more detail below). This process establishes the graph coordinate frame and localizes the four core unmanned aerial vehicles (nodes). The unmanned aerial vehicles (nodes) are marked as localized for use in the second step.

Step 2.) Then, the algorithm iterates over each non-localized unmanned aerial vehicles (nodes) and counts the number of ranges it has available to already localized unmanned aerial vehicles (nodes). If there are fewer than four ranges available, it is not mathematically possible to find a unique solution. With at least four ranges and positions, it is possible to perform trilateration to find a unique solution. That calculation is performed in the function RANSAC_Localize, which is discussed further below. Due to possible error in the range information, any existing redundant ranges to localized drones/nodes are also passed as they can be used to reduce error. Any localizable node/node is localized and marked as such.

Step 3.) Repeat step 2 until all drones/nodes are localized.

The following is exemplary pseudocode that may be used to implement the Localize function:

| | Localize( ) |
|---|---|
| 1 | Input: edgeval_matrix, an NxN symmetric, 0s on diagonal, matrix where index [i,j] contains the range between drone i and drone j |
| 2 | Output: Estimated relative positions of each drone |
| 3 | Initialize boolean localized vector, float positions vector |
| 4 | positions[:4] = Localize Tetrahedron(edgeval_matrix[:4,:4]) |
| 5 | localized[:4] = True |
| 6 | While all(localized) != True |
| 7 | \| For each drone i not localized |
| 8 | \| \| Find indexes of localized drones from which a range is available to drone i |
| 9 | \| \| If len(indexes) >= 4 |
| 10 | \| \| \| positions[i] = RANSAC_Localize(ranges[indexes], positions [indexes]) |
| 11 | \| \| \| localized[i] = True |
| 12 | \| \| End If |
| 13 | \| End For |
| 14 | End While |
| 15 | Return positions |

In embodiments, given six ranges between four fully connected unmanned aerial vehicles (nodes), the Localize Tetrahedron function outputs four positions of the unmanned aerial vehicles (nodes) in question.

In embodiments, the first unmanned aerial vehicle (112-1) is simply defined as the origin, the second unmanned aerial vehicle (any one of 112-2, 112-3, 112-4, 112-n) is defined as being along the x axis the appropriate distance away from the first. The third unmanned aerial vehicle is defined as being in the x-y plane. Given the three sides of a triangle, it is possible to find the angles of the triangle by the law of cosines, for example. This angle may be used to find the x and y coordinates of the third drone. In embodiments, the fourth unmanned aerial vehicle may be found using a least squares iterative regression approach. The x,y,z coordinates of the fourth unmanned aerial vehicle may be estimated and checked for the difference in calculated range between the estimated x,y,z coordinates and the other unmanned aerial vehicle positions, and the range inputs. The estimated x,y,z is adjusted until the difference between calculated ranges and measured ranges is close enough to zero to be acceptable. In embodiments, the iterative approach is used to solve the problem of inherent error in measurements from range sensors. In embodiments, the positions are returned.

The following exemplary pseudocode may be used to implement the Localize Tetrahedron:

| | Localize_Tetrahedron( ) |
|---|---|
| 1 | Input: d, an 4x4 symmetric, 0s on diagonal, matrix where index [i,j] contains the range between drone i and drone j |
| 2 | Output: Estimated relative positions of each drone |
| 3 | positions[0] = (0,0,0) |
| 4 | positions[1] = (d[0,1],0,0) |
| 5 | Use law of cosines with d[0,1], [[0,2], [1,2] to find x,y |
| 6 | positions[2] = (x,y,0) |
| 7 | Use least squares with d[0,3], d[1,3], d[2,3] to find x,y,z |
| 8 | positions[2] = (x,y,z) |
| 9 | Return positions |

In embodiments, the Random Sample Consensus (RANSAC) regression discussed above may use as much or as little redundant information as available to trilaterate an individual unmanned aerial vehicle given positions and ranges from at least four other drones/nodes. In embodiments, trilateration is the process of finding the intersection point of 4 spheres of various radii and center positions. Trilateration may be used in the present method based on extension of Fang's method (an example of that method may be found: https://github.com/akshayb6/trilateration-in-3d/blob/master/trilateration.py). In embodiments other methods of trilateration may be used. In embodiments, all sets of drones from given ones that can be used for trilateration of unique points are determined. In embodiments, when information from only four unmanned aerial vehicles is provided, then only one such combination exists. In embodiments, where information from many unmanned aerial vehicles/zones is available, the number of combinations may be very large. In embodiments, some fixed number of those combinations may be randomly selected for use in the algorithm.

In embodiments, trilateration may be performed using information from all chosen combinations of unmanned aerial vehicles (nodes). In embodiments, for each resulting position estimate, the mean squared range error (MSE) may be found. Specifically, in embodiments, the distances between the estimate and the rest of the unmanned aerial vehicles (nodes) may be calculated and compared against the measured ranges, the difference (or error) is squared and averaged.

In embodiments, the estimated position samples may be sorted by their MSE, with the lowest error first. In embodiments, the function selects some portion (e.g., 30%) of the estimates with the lowest MSEs and averages them together. In embodiments, this average may be returned.

The following exemplary pseudocode may be used to implement the RANSAC regression:

| RANSAC_Localize( ) |
|---|
| 1 Input: positions and respective ranges from them to a drone |
| 2 Output: Estimated position of the ranged drone |
| 3 Args: Number of combinations to compute n, ratio of samples to average p |
| 4 Find all_combinations of 4 ranges that produce unique trilateration outputs |
| 5 combinations = Randomly choose n from all_combinations |
| 6 Initialize estimates, MSEs of length n |
| 7 For each indx, combination in combinations |
| 8     estimates[indx] = Trilateration(positions[combination] , ranges [combination]) |
| 9     MSEs[indx] = MeanSquaredError(estimates[indx], positions, ranges) |
| 10 End For |
| 11 Sort estimates by MSE ascending |
| 12 Return average(estimates[:(p*n)]) |

In embodiments, step S612 is followed by step S614 in which the second set of estimated position information is transmitted by the processor 208 of the of the first ultra-wideband transceiver 102-1 of the first unmanned aerial vehicle 112-1 to the navigation system, that is, the flight controller 110-1. In embodiments, the second set of estimated position information may be transmitted by a processor of the companion computer 208 to the flight controller 110-1.

In embodiments, the transmitting step S614 may include transmitting the second set of estimated position information associated with the first unmanned aerial vehicle to each unmanned aerial vehicle 112-2, 112-3, 112-4, 112-n of the first set of unmanned aerial vehicles. In embodiments, the method may include a step of storing the second set of estimated position information in the memory 206-1, or another memory operably connected to the processor 216 or a processor of the companion computer 208. In embodiments, the transmitting steps S614 may include transmitting the second set of estimated position information associated with the first unmanned aerial vehicle to a central ground system.

In embodiments, the method may include receiving, by the first ultra-wideband transceiver 102-1, respective estimated position information associated with at least a fifth unmanned aerial vehicle, a sixth unmanned aerial vehicle, and a seventh unmanned aerial vehicle included in the first set of unmanned aerial vehicles. In embodiments, the method may include receiving, by the first ultra-wideband transceiver 102-1, respective estimated position associated with the fourth unmanned aerial, a fifth unmanned aerial vehicle, and a sixth unmanned aerial vehicle.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. An unmanned aerial vehicle comprising:
 (A) a flight controller;
 (B) an ultra-wideband transceiver including a first processor;
 (C) an inertial measurement unit;
 (D) a first navigation system; and
 (E) a companion computer configured to determine a position of the unmanned aerial vehicle with respect to a first set of unmanned aerial vehicles including at least a second unmanned aerial vehicle, a third unmanned aerial vehicle, and a fourth unmanned aerial vehicle, the companion computer including a second processor operatively connected to a memory, the memory having stored thereon processor executable instructions that, when executed by the second processor of the companion computer, perform the steps of:
  (a) obtaining:
   (1) from the first processor of the ultra-wideband transceiver, a first set of estimated range determinations associated with the first set of unmanned aerial vehicles, wherein each respective estimated range determination of the first set of estimated range determinations is associated with a respective range timestamp and a first set of estimated position information associated with a respective unmanned aerial vehicle including respective three-dimensional distance information associated with each unmanned aerial vehicle of the first set of unmanned aerial vehicles relative to the unmanned aerial vehicle;
   (2) from the first navigation system, first location information, wherein the first location information is associated with a first respective sensor timestamp; and
   (3) from the inertial measurement unit:
    (i) first acceleration information, wherein the first acceleration information is associated with a second respective sensor timestamp;
    (ii) first angular rate information, wherein the first angular rate information is associated with a third respective sensor timestamp; and
    (iii) first magnetic field information, wherein the first magnetic field information is associated with a fourth respective sensor timestamp;
  (b) determining a respective weight for each estimated range determination, the first location information, the first acceleration information, the first angular rate information, and the first magnetic field information based on:
- (i) one or more predetermined weighting factors;
- (ii) the respective range timestamp associated with each estimated range determination;
- (iii) the first respective sensor timestamp;
- (iv) the second respective sensor timestamp;
- (v) the third respective sensor timestamp; and
- (vi) the fourth respective sensor timestamp;

(c) generating a first set of filtered estimated ranges associated with each respective unmanned aerial vehicle in the first set of unmanned aerial vehicles based on the first set of estimated position information, the first set of estimated range determinations, the first location information, the first acceleration information, the first angular rate information, and the first magnetic field information, and the respective weight determined for each of the first set of estimated range determinations, the first location information, the first acceleration information, the first angular rate information, and the first magnetic field information; and (d) processing the first set of filtered estimated ranges associated with each unmanned aerial vehicle of the first set of unmanned aerial vehicles to generate a second set of estimated position information associated with the unmanned aerial vehicle, including:
- (1) determining a first set of magnitude error estimates based on the first set of filtered estimated ranges and the first set of estimated position information, wherein each magnitude error estimate is associated with an error between a position of the unmanned aerial vehicle and the position of each unmanned aerial vehicle in the first set of unmanned aerial vehicles;
- (2) determining a first three-dimensional direction which minimizes the error between the position of the unmanned aerial vehicle and the position of each unmanned aerial vehicle in the first set of unmanned aerial vehicles based on the first set of magnitude error estimates; and
- (3) generating a second set of estimated position information associated with the unmanned aerial vehicle as a first output based on the first three-dimensional direction and the first set of estimated position information, (e) providing the second set of estimated position information to the ultra-wideband transceiver, wherein the first processor of the ultra-wideband transceiver is configured to transmit the second set of estimated position information to at least the second unmanned aerial vehicle.

2. The unmanned aerial vehicle of claim 1, wherein the second processor obtains the first set of estimated position information while the first set of unmanned aerial vehicles are configured on a surface to allow the first set of estimated position information to be communicated to each unmanned aerial vehicle of the first set of unmanned aerial vehicles.

3. The unmanned aerial vehicle of claim 2, wherein the second processor obtains the first set of estimated position information from a centralized ground system.

4. The unmanned aerial vehicle of claim 1, wherein the second processor obtains the first set of estimated position information while the first set of unmanned aerial vehicles is in a geometric configuration above a surface.

5. The unmanned aerial vehicle of claim 1, wherein the second processor obtains the first set of estimated position information using a respective navigation system of each unmanned aerial vehicle of the first set of unmanned aerial vehicles.

6. The unmanned aerial vehicle of claim 1, wherein the memory includes processor executable instructions that when executed by the second processor performs a step of organizing the first set of estimated range determinations in a predetermined order of each unmanned aerial vehicle in the first set of unmanned aerial vehicles.

7. The unmanned aerial vehicle of claim 6, wherein each estimated range determination of the first set of estimated range determinations comprises a respective estimated range determination between the ultra-wideband transceiver and a respective second ultra-wideband transceiver associated with one of the second unmanned aerial vehicle, the third unmanned aerial vehicle, and the fourth unmanned aerial vehicle using asymmetric double sided two-way ranging, and wherein the ultra-wideband transceiver includes a second memory operably connected to the first processor, wherein the second memory includes processor executable instructions that when executed by the first processor perform the steps of:
- (i) transmitting, from the ultra-wideband transceiver, a first poll message to the respective second ultra-wideband transceiver at a first time;
- (ii) receiving, by the ultra-wideband transceiver, a first delayed response message from the respective second ultra-wideband transceiver by the ultra-wideband transceiver at a second time, wherein the first delayed response message comprises a third time when the first poll message was received by the respective second ultra-wideband transceiver and a fourth time when the first delayed response message was transmitted by the respective second ultra-wideband transceiver;
- (iii) transmitting, by the ultra-wideband transceiver, a first delayed final message to the respective second ultra-wideband transceiver at a fifth time in response to the first delayed response message, wherein the first delayed final message is received by the respective second ultra-wideband transceiver at a sixth time; and
- (iv) determining, by the first processor of the ultra-wideband transceiver, the respective estimated range determination between the ultra-wideband transceiver and the respective second ultra-wideband transceiver based on the first time, the second time, the third time, the fourth time, the fifth time, and the sixth time.

8. The unmanned aerial vehicle of claim 7, wherein the determining step iv. includes steps of:
(a) determining a time of flight associated with each message by the formula:

$$T_{prop} = \frac{T_{round1} \times T_{round2} - T_{reply1} \times T_{reply2}}{T_{round1} + T_{round2} + T_{reply1} + T_{reply2}}$$

where $T_{prop}$ is the time of flight associated with each message, $T_{round1}$ is a difference between the first time and the second time, $T_{reply1}$ is a difference between the fourth time and the third time, $T_{round2}$ is a difference between the sixth time and the fourth time, and $T_{reply2}$ is a difference between the fifth time and the second time; and (b) determining the respective estimated range determination by the formula:

$$D=c(T_{prop})$$

where D is the respective estimated range determination between the ultra-wideband transceiver and the respective second ultra-wideband transceiver, c is a speed of radio waves, and $T_{prop}$ is the time of flight associated with each message.

9. The unmanned aerial vehicle of claim 1, wherein the second processor uses an Extended Kalman Filter calculation.

10. The unmanned aerial vehicle of claim 1, wherein the first navigation system includes a flight control computer.

11. The unmanned aerial vehicle of claim 1, wherein the inertial measurement unit comprises at least one of:
(1) a first accelerometer configured to generate the first acceleration information associated with a measured acceleration;
(2) a first gyroscope configured to generate first angular rate information associated with a measured angular velocity; and
(3) a first magnetometer configured to generate the first magnetic field information associated with a measured magnetic field.

12. The unmanned aerial vehicle of claim 11, wherein the first angular rate information is angular velocity information.

13. The unmanned aerial vehicle of claim 1, wherein the respective weight is further based on at least a fifth respective sensor timestamp.

14. The unmanned aerial vehicle of claim 1, wherein the first set of filtered estimated ranges comprises a filtered list of ranges associated with a respective three-dimensional distance between the unmanned aerial vehicle and each respective unmanned aerial vehicle of the first set of unmanned aerial vehicles.

15. The unmanned aerial vehicle of claim 1, wherein the first set of filtered estimated ranges is generated based on an Extended Kalman Filter calculation.

16. The unmanned aerial vehicle of claim 1, wherein the second processor uses a reverse Gauss-Newton calculation.

17. The unmanned aerial vehicle of claim 1, wherein the step of determining the first set of magnitude error estimates includes:

(i) calculating a first set of respective initial range estimates associated with each unmanned aerial vehicle based on the first set of estimated position information; and
(ii) subtracting each initial range estimate of the first set of respective initial range estimates from each respective filtered range estimate of the first set of filtered estimated ranges to generate each respective magnitude error estimate.

18. The unmanned aerial vehicle of claim 1, wherein the second processor repeats step d) using the second set of estimated position information and a second set of filtered estimated ranges associated with each respective unmanned aerial vehicle to generate a third set of estimated position information.

19. The unmanned aerial vehicle of claim 18, wherein step d) is repeated a predetermined number of times.

20. The unmanned aerial vehicle of claim 18, wherein step d) is repeated until at least one of:
a. a difference between the third set of estimated position information and the second set of estimated position information is below a predetermined threshold;
b. a second magnitude error estimate is within a predetermined range; and
c. a root mean square of a second set of magnitude error estimates is below a predetermined threshold.

21. The unmanned aerial vehicle of claim 1, wherein the ultra-wideband transceiver transmits the second set of estimated position information associated with the unmanned aerial vehicle to each unmanned aerial vehicle of the first set of unmanned aerial vehicles.

22. The unmanned aerial vehicle of claim 1, wherein the memory includes processor executable code that when executed by the second processor stores the second set of estimated position information in the memory.

23. The unmanned aerial vehicle of claim 1, wherein the ultra-wideband transceiver transmits the second set of estimated position information associated with the unmanned aerial vehicle to a centralized ground system.

24. The unmanned aerial vehicle of claim 1, wherein the ultra-wideband transceiver receives a respective estimated position associated with at least a fifth unmanned aerial vehicle, a sixth unmanned aerial vehicle, and a seventh unmanned aerial vehicle.

25. The unmanned aerial vehicle of claim 1, wherein the ultra-wideband transceiver receives a respective estimated position associated with at least the fourth unmanned aerial vehicle, a fifth unmanned aerial vehicle, and a sixth unmanned aerial vehicle.

* * * * *